United States Patent [19]
Morita et al.

[11] Patent Number: 5,708,057
[45] Date of Patent: Jan. 13, 1998

[54] SILICONE-MODIFIED WATER-BASED COATING COMPOSITION

[75] Inventors: Yoshitsugu Morita; Atsushi Sakuma, both of Chiba Prefecture; Noriyasu Yokoyama, Tokyo Prefecture; Keiji Yoshida, Chiba Prefecture, all of Japan

[73] Assignee: Dow Corning Toray Silicone Co., Ltd., Tokyo, Japan

[21] Appl. No.: 900,865

[22] Filed: Jun. 18, 1992

[30] Foreign Application Priority Data

Jun. 28, 1991 [JP] Japan ................................ 3-185314

[51] Int. Cl.$^6$ .................................................. C08D 183/04
[52] U.S. Cl. .......................... 523/402; 523/435; 523/501; 524/501; 524/506; 524/588; 524/589; 525/29; 525/100; 525/446; 525/453; 525/476; 525/477
[58] Field of Search ...................... 524/501, 506, 524/588, 589; 525/100, 476, 477, 29, 446, 457; 523/402, 501, 435

[56] References Cited

U.S. PATENT DOCUMENTS

| | | | |
|---|---|---|---|
| 2,870,035 | 1/1959 | Allen | 106/192 |
| 4,803,233 | 2/1989 | Narula et al. | 524/58 |

FOREIGN PATENT DOCUMENTS

| | | |
|---|---|---|
| 842947 | of 0000 | Canada . |
| 754212 | 3/1967 | Canada . |
| 449263 | 10/1991 | European Pat. Off. . |
| 2355813 | 6/1975 | Germany . |
| 52-86426 | 7/1977 | Japan . |
| 58-93762 | 6/1983 | Japan . |
| 59-74171 | 4/1984 | Japan . |
| 2-113079 | 4/1990 | Japan . |
| 807453 | 5/1955 | United Kingdom . |
| 2222167 | 2/1990 | United Kingdom . |

*Primary Examiner*—Ralph H. Dean
*Attorney, Agent, or Firm*—Sharon K. Severance

[57] ABSTRACT

A silicone-modified water-based coating composition is disclosed wherein a suspension of silicone rubber particles in water is added to a water-based coating composition such that the resulting system is storage-stable and forms a mat film when dried or cured, which film is soft to the touch.

16 Claims, No Drawings

SILICONE-MODIFIED WATER-BASED COATING COMPOSITION

The present invention relates to a silicon-modified water-based coating composition, and, more particularly, to a highly storage-stable water-based coating composition that forms a mat or flat film that is soft to the touch.

BACKGROUND OF THE INVENTION

Mat-film-forming water-based coating compositions are inherently free of the problems of flammability, toxicity, and environmental pollution which are associated with organic solvent-based coating compositions. In addition, they can be loaded to relatively high concentrations with the high-molecular-weight coating resin which is their principal component. These water-based coating compositions are used to impart an antiglare (i.e., flat) character and a soft or subdued appearance to the surface of plastic and metal parts for, e.g., household electrical appliances and products, office automation equipment, automobile parts, and building materials.

As these water-based coating compositions, the art teaches water-based coating compositions prepared by the addition of inorganic micropowder to a water-based coating composition, for example, a metal oxide or hydroxide such as microparticulate aluminum oxide sol, microparticulate silicon oxide sol, microparticulate titanium oxide sol, microparticulate nickel oxide sol, microparticulate zirconium oxide sol, and microparticulate antimony oxide sol (refer to Japanese Patent Application Laid Open (Kokai or Unexamined) Number 52-86426 (86,426/77)).

However, water-based coating compositions prepared by the addition of inorganic micropowder have a poor storage stability and produce a hard precipitate that resists re-dispersion, and the coating film itself can present gloss patches and is subject to chalking. In addition, the flat (i.e., mat finish) coating film is rough or gritty to the touch.

Water-based coating compositions prepared by the addition of organic resin microparticles have also been proposed in order to solve the problems listed above, and an example in this regard is a water-based coating composition prepared by the addition of an internally crosslinked polymer emulsion made from multifunctional vinyl monomer and monofunctional vinyl monomer (Japanese Patent Application Laid Open Number 58-93762 (93,762/83)). Another example here is a water-based coating composition prepared by the addition of an emulsion whose essential components are the following two layers: a polymer layer whose main component is alkyl methacrylate or aromatic vinyl monomer, and a crosslinked polymer layer whose main components are aromatic vinyl monomer and alkyl acrylate (refer to Japanese Patent Application Laid Open Number 59-74171 [74,171/84]).

However, the storage stability is poor even for water-based coating compositions prepared by the addition of organic resin microparticles. In addition, the flatted coating film is again rough or gritty to the touch. And finally, because the organic resin particles have a poor heat resistance and poor weathering resistance, deterioration of the flat film proceeds relatively rapidly.

A coating composition prepared by the addition of microparticulate silicone rubber is known from Japanese Patent Application Laid Open Number 2-113079 (113,079/90). However, in the case of water-based coating compositions, achieving a uniform dispersion of the silicone rubber microparticles in the water-based coating composition is highly problematic, and the water-based coating composition obtained here has a poor storage stability. Moreover, this coating composition cannot provide a uniform coating film because the silicone rubber forms lumps on the surface of the coating film.

SUMMARY OF THE INVENTION

The present invention takes as its object the introduction of a highly storage-stable silicone-modified water-based coating composition that forms a mat or flat film that is soft to the touch.

The present invention therefore relates to a silicone-modified water-based coating composition comprising water-based coating composition to which a silicone rubber suspension has been added.

DETAILED DESCRIPTION OF THE INVENTION

The water-based coating composition used in the present invention comprises a coating resin component emulsified in water. No particular restriction applies here as long as after application the coating resin component dries or cures in association with removal of the water fraction to form a coating film. Examples in this regard are water-based coating compositions that cure at ambient temperature, water-based coating compositions that dry at ambient temperature, and thermosetting water-based coating compositions. Such water-based coating compositions are more specifically exemplified by water-based polyurethane resin coating compositions, water-based alkyd resin coating compositions, water-based aminoalkyd resin (amino resin+ alkyd resin) coating compositions, water-based epoxy resin coating compositions, water-based acrylic resin coating compositions, water-based silicone-modified epoxy resin coating compositions, water-based silicone-modified polyester resin coating compositions, and water-based silicone resin coating compositions.

The distinguishing or characterizing feature of the present invention resides in the addition of a silicone rubber suspension to a water-based coating composition as described above. The silicone rubber suspension employed by the present invention comprises the dispersion of a silicone rubber microparticulate in water. While the particle size of the silicone rubber microparticulate in said silicone rubber suspension is not specifically restricted, the average particle size of the silicone rubber microparticulate in the silicone rubber suspension preferably does not exceed 200 micrometers. Particularly preferred silicone rubber suspensions will contain silicone rubber microparticulate whose average particle size falls within the range of 1 to 100 micrometers: this avoids problems such as clogging, etc., when the silicone-modified water-based coating composition is applied by spraying. The quantity of addition of the silicone rubber suspension is not specifically restricted as long as a sufficient quantity is added to impart a flat or mat character to the ultimately obtained coating film. However, the content of the silicone rubber microparticulate preferably falls within the range of 1.0 to 150 weight parts and particularly preferably within the range of 1 to 100 weight parts per 100 weight parts total solids in the water-based coating composition.

This silicone rubber suspension can be prepared, for example, by emulsifying a liquid silicone rubber composition in water and then curing the liquid silicone rubber composition. This liquid silicone rubber composition is exemplified by addition-reaction-curing liquid silicone rubber compositions which cure by a platinum-catalyzed addition reaction, condensation-reaction-curing liquid silicone rubber compositions which cure by a condensation reaction in the presence of an organotin compound or organotitanium compound, and organoperoxide-curing liquid silicone rubber compositions. However, the method for preparing the silicone rubber suspension employed by the present invention is not restricted to the preceding.

The aforesaid addition-reaction-curing liquid silicone rubber compositions comprise liquid silicone rubber compositions whose essential components are organopolysiloxane containing silicon-bonded alkenyl groups, SiH-containing organopolysiloxane, and platinum-type catalyst. These may optionally contain filler, pigment, and curing-reaction retarder. The aforesaid condensation-reaction-curing liquid silicone rubber compositions comprise liquid silicone rubber compositions whose essential components are silanol-containing organopolysiloxane, SiH-containing organopolysiloxane or alkoxysilane, and curing catalyst (organotin compound, organotitanium compound, or platinum-type compound). The aforesaid organoperoxide-curing liquid silicone rubber compositions comprise liquid silicone rubber compositions whose essential components are vinyl-containing organopolysiloxane and organoperoxide. Both of these systems may also optionally contain filler and pigment.

Filler which may be blended into the above-listed liquid silicone rubber compositions is exemplified by reinforcing filler such as precipitated silica, fumed silica, calcined silica, fumed titanium oxide, and the like, and by nonreinforcing filler such as powdered quartz, diatomaceous earth, asbestos, aluminosilicic acid, iron oxide, zinc oxide, calcium carbonate, and the like. This filler may be directly blended into the liquid silicone rubber composition, or it may be admixed after treatment of its surface with an organosilicon compound such as hexamethyldisilazane, trimethylchlorosilane, dimethylsiloxane oligomer, and the like. Furthermore, the following may be admixed on an optional basis: pigments, curing-reaction retarders, epoxy-containing organic compounds, amino-containing organic compounds, heat stabilizers, flame retardants, plasticizers, and noncurable organopolysiloxanes.

The silicone rubber suspension can be prepared by first (i) introducing a liquid silicone rubber composition as described above into water and forming an emulsion thereof by mixing to homogeneity using a mixing means such as a colloid mill or homomixer, and then (ii) curing the liquid silicone rubber composition. The use of a surfactant is preferred here in order to improve the storage stability of the silicone rubber suspension and in order to support an increased content of silicone rubber microparticulate. Specifically, the use of a particular type of surfactant is preferred for the purpose of preparing a silicone rubber suspension having a high concentration of silicone rubber microparticulate. For example, it is preferred to use two types of nonionic surfactants having different HLB values, and it is particularly preferred within this context that their HLB values differ by at least 5. Finally, the degree of curing of the silicone rubber is not specifically restricted.

The method for preparing the silicone-modified water-based coating composition is not specifically restricted, and it may be prepared simply by the addition, with mixing, of a separately prepared silicone rubber suspension to a water-based coating composition. The silicone-modified water-based coating composition according to the present invention may also be manufactured by preparing the coating resin component itself in the silicone rubber suspension. In the case of the preparation of a water-based coating composition whose water-based coating composition has a high total solids concentration, the use is preferred of a silicone rubber suspension having a high concentration of silicone rubber microparticulate. Also preferred for this case is the preparation of the coating resin component in the silicone rubber suspension.

With regard to components other than the silicone rubber suspension, the silicone-modified water-based coating composition according to the present invention may contain inorganic powder, thickener, pigment, and the like, as long as the object of the present invention is not impaired.

The silicone-modified water-based coating composition according to the present invention can be applied by those coating methods employed for ordinary organic solvent-based coating compositions, for example, spray coating, electrostatic coating, immersion coating, curtain flow coating, roll coating, shower coating, and the like.

EXAMPLES

The present invention is explained in greater detail below through illustrative examples, comparison examples, and reference examples. The viscosity values reported in the examples were measured at 25° C. The coating operation was evaluated based on whether the water-based coating composition could be uniformly applied on iron sheet and aluminum sheet.

Reference Example 1

(Preparation of silicone rubber suspension)

The following were mixed to prepare composition (A): 95 weight parts hydroxyl-terminated dimethylpolysiloxane with viscosity=80 centipoise and hydroxyl content=1.3 weight%, 5 weight parts 3-glycidoxypropyltrimethoxysilane, and 20 weight parts dimethylhydrogensiloxy-terminated methylhydrogenpolysiloxane with viscosity=10 centistokes and silicon-bondedhydrogen content=1.5 weight %.

The following were then mixed to give composition (B): 95 weight parts hydroxyl-terminated dimethylpolysiloxane with viscosity=80 centipoise and hydroxyl content=1.3 weight %, 5 weight parts 3-glycidoxypropyltrimethoxysilane, and 1.0 weight parts dibutyltin dioctoate.

These compositions (A) and (B) were introduced into separate storage tanks and the tanks were cooled to −10° C. 500 weight parts composition (A) and 500 weight parts composition (B) were supplied to a static mixer (from Tokushu Kika Kogyo Company, Limited, Japan) and thereby mixed to homogeneity. This was then transferred to a mixer equipped with a high speed stirrer, into which 20 weight parts nonionic surfactant (Tergitol™ TMN-6, ethylene oxide adduct of trimethylnonanol, from Union Carbide Corporation) and 9,000 weight parts ion-exchanged water were poured all at once while stirring at 1,400 rpm. Passage through a colloid mill afforded the emulsion of a liquid silicone rubber composition. A silicone rubber suspension was prepared by holding this liquid silicone rubber composition emulsion at room temperature for 2 days. This silicone rubber suspension contained 11 weight % silicone rubber microparticles, and the average particle size of the silicone rubber microparticles was 3 micrometers. Separation of the silicone rubber microparticles from the aqueous layer was not observed even after this silicone rubber suspension had been held for 1 year at room temperature.

Reference Example 2

(Preparation of silicone rubber suspension)

A liquid silicone rubber composition was prepared from 50 weight parts dimethylvinylsiloxy-terminated dimethylpolysiloxane with viscosity=400 centipoise, 3.7 weight parts methylhydrogenpolysiloxane, $7.5\times10^{-3}$ weight parts tetramethyltetravinylcyclotetrasiloxane, and sufficient isopropanolic chloroplatinic acid solution to provide 120 ppm platinum metal referred to the total quantity of the preceding. Into this was mixed 0.25 weight parts polyoxyethylene nonylphenyl ether with HLB=5.7. The mixture of 10 weight parts pure water and 1 weight part polyoxyethylene octylphenyl ether (HLB=18.1) was then dripped in over approximately 5 minutes while stirring, followed by stirring at 600 rpm for approximately 1 hour. Using a colloid mill, this mixture was converted into a viscous emulsion of the liquid silicone rubber composition. This was introduced into pure water to give a liquid silicone rubber composition content of 50 weight %, affording thereby a homogeneous emulsion of the liquid silicone rubber composition. Heating this for 1 hour at 50° C. then gave a homogeneous silicone rubber suspension. The silicone rubber microparticles in this silicone rubber suspension had an average particle size of 1.0 micrometers. Separation of the silicone rubber microparticles from the aqueous layer was not observed even after this silicone rubber suspension had been held for 3 months at room temperature.

Reference Example 3

(Preparation of silicone rubber microparticles)

The silicone rubber suspension prepared in Reference Example 1 was heated for 1 week in an oven at 70° C. Lumps of silicone rubber were obtained, and these secondary aggregates were broken up using a mortar to give a silicone rubber microparticulate with an average particle size of 3 micrometers.

Reference Example 4

(Preparation of silicone rubber microparticles)

A composition (C) was prepared by mixing 100 weight parts dimethylvinylsiloxy-terminated dimethylpolysiloxane (viscosity=2,000 centipoise, vinyl content=0.25 weight %) and 3 weight parts trimethylsiloxy-terminated methylhydrogenpolysiloxane containing 1 weight % silicon-bonded hydrogen.

A composition (D) was then prepared by mixing 100 weight parts dimethylvinylsiloxy-terminated dimethylpolysiloxane (viscosity=2,000 centipoise, vinyl content=0.25 weight %) and 0.3 weight parts isopropanolic chloroplatinic acid solution (platinum content=3 weight %).

These compositions (C) and (D) were introduced into separate storage tanks and the tanks were cooled to –30° C. 250 weight parts composition (C) and 250 weight parts composition (D) were supplied to a homomixer (preliminarily brought to 5° C.) and mixed to homogeneity. 100 weight parts nonionic surfactant (Tergitol™ TMN-6, ethylene oxide adduct of trimethylnonanol, from Union Carbide Corporation) was then added, and, after mixing for 1 hour, 1,000 weight parts ion-exchanged water was added and emulsification was carried out in a colloid mill. This was subsequently mixed with 2,000 weight parts warm water (40° C.), followed by standing for 1 day and then drying for 1 week in an oven at 70° C. The product was a silicone rubber microparticulate that had an average particle diameter of 5 micrometers.

Example 1

A water-based silicone-modified acrylic resin coating composition was prepared by mixing 100 weight parts water-based acrylic resin coating composition (Almighty White from Atom Kagaku Toryo Kabushiki Kaisha, Japan, solids concentration=50 weight %) and 10 weight parts of the silicone rubber suspension prepared in Reference Example 1. It was observed here that the silicone rubber suspension could be easily mixed into the water-based acrylic resin coating composition and could be dispersed to homogeneity. This silicone rubber suspension-loaded, water-based acrylic resin coating composition was painted several times on iron sheet and aluminum sheet followed by standing at room temperature for 3 days. The thickness of the coating film after drying was 80 micrometers. The condition of the coating film after drying was subsequently evaluated. In addition, the storage stability of the silicone rubber suspension-loaded, water-based acrylic resin coating composition was evaluated after standing for at least 1 month at room temperature. These results are reported in Table 1.

Example 2

A silicone-modified water-based acrylic resin coating composition was prepared by mixing 100 weight parts water-based acrylic resin coating composition (Almighty White from Atom Kagaku Toryo Kabushiki Kaisha, solids concentration=50 weight %) and 6 weight parts of the silicone rubber suspension prepared in Reference Example 2. It was observed here that the silicone rubber suspension could be easily mixed into the water-based acrylic resin coating composition and could be dispersed to homogeneity. This silicone rubber suspension-loaded, water-based acrylic resin coating composition was coated on iron sheet and aluminum sheet followed by standing at room temperature for 3 days. The thickness of the coating film after drying was 80 micrometers. The condition of the coating film after drying was subsequently evaluated. In addition, the storage stability of the silicone rubber suspension-loaded, water-based acrylic resin coating composition was evaluated after standing for at least 1 month at room temperature. These results are reported in Table 1.

Comparison Example 1

A silicone-modified water-based acrylic resin coating composition was prepared by mixing 100 weight parts water-based acrylic resin coating composition (Almighty White from Atom Kagaku Toryo Kabushiki Kaisha, solids concentration=50 weight %) and 1 weight part of the silicone rubber microparticles prepared in Reference Example 3. It was observed here that the silicone rubber microparticles could not be homogeneously dispersed in the water-based acrylic resin coating composition and that the silicone rubber microparticles were present in the water-based acrylic resin coating composition in an aggregated state. This silicone rubber microparticle-loaded, water-based acrylic resin coating composition was coated on iron sheet and aluminum sheet followed by standing at room temperature for 3 days. The thickness of the coating film after drying was 80 micrometers. The condition of the coating film after drying was subsequently evaluated. In addition, the storage stability of the silicone rubber microparticle-loaded, water-based acrylic resin coating composition was evaluated after standing for at least 1 month at room temperature. These results are reported in Table 1.

Comparison Example 2

A silicone-modified water-based acrylic resin coating composition was prepared by mixing 100 weight parts water-based acrylic resin coating composition (Almighty White from Atom Kagaku Toryo Kabushiki Kaisha, solids concentration=50 weight %) and 3 weight parts of the silicone rubber microparticles prepared in Reference Example 4. It was observed here that the silicone rubber microparticles could not be homogeneously dispersed in the water-based acrylic resin coating composition and that the silicone rubber microparticles were present in the water-based acrylic resin coating composition in an aggregated state. This silicone rubber microparticle-loaded, water-based acrylic resin coating composition was coated on iron sheet and aluminum sheet followed by standing at room temperature for 3 days. The thickness of the coating film after drying was 80 micrometers. The condition of the coating film after drying was subsequently evaluated. In addition, the storage stability of the silicone rubber microparticle-loaded, water-based acrylic resin coating composition was evaluated after standing for at least 1 month at room temperature. These results are reported in Table 1.

Comparison Example 3

The water-based acrylic resin coating composition (Almighty White from Atom Kagaku Toryo Kabushiki Kaisha, solids concentration=50 weight %) was coated on iron sheet and aluminum sheet followed by standing for 3 days at room temperature. The thickness of the coating film after drying was 80 micrometers. The condition of the coating film after drying was subsequently evaluated. In addition, the storage stability of the water-based acrylic resin coating composition was evaluated after standing for at least 1 month at room temperature. These results are also reported in Table 1.

Effects of the Invention

Because the water-based coating composition according to the present invention is loaded with a silicone rubber suspension, the water-based coating composition according to the present invention is characterized by the uniform dispersion of silicone rubber microparticles in the water-based coating composition, by its excellent storage stability, and by its ability to form a flatted or mat film that is soft to the touch.

(A) a water-based coating composition; and (B) a suspension of a plurality of silicone rubber particles in water, the content of said silicone rubber suspension (B) being such that said silicone-modified water-based coating composition is storage-stable and forms a mat film which is soft to the touch.

2. The composition according to claim 1, wherein the average size of said silicone rubber particles is ≦200 micrometers.

3. The composition according to claim 2, wherein said water-based coating composition (A) is selected from the group consisting of water-based polyurethane resin coating compositions, water-based alkyd resin coating compositions, water-based aminoalkyd resin coating compositions, water-based epoxy resin coating compositions, water-based acrylic resin coating compositions, water-based silicone-modified epoxy resin coating compositions, water-based silicone-modified polyester resin coating compositions and water-based silicone resin coating compositions.

4. The composition according to claim 3, wherein 1 to 150 parts by weight of said particles of suspension (B) are used for each 100 parts by weight of the total solids in said water-based coating composition (A).

5. The composition according to claim 1, wherein said silicone rubber particles have an average size of 1 to 100 micrometers.

6. The composition according to claim 3, wherein said silicone rubber particles have an average size of 1 to 100 micrometers.

7. The composition according to claim 4, wherein said silicone rubber particles have an average size of 1 to 100 micrometers.

8. The composition according to claim 1, wherein said silicone rubber particles are polydimethylsiloxane.

9. The composition according to claim 8, wherein the average size of said polydimethylsiloxane rubber particles is ≦200 micrometers.

10. The composition according to claim 9, wherein said water-based coating composition (A) is selected from the group consisting of water-based polyurethane resin coating compositions, water-based alkyd resin coating compositions, water-based aminoalkyd resin coating

TABLE 1

|  | Example 1 | Example 2 | Comparison Example 1 | Comparison Example 2 | Comparison Example 3 |
| --- | --- | --- | --- | --- | --- |
| evaluation of coating operation | excellent | good | poor | poor | excellent |
| appearance of coating film | surface is uniform and free of gloss | surface is uniform and free of gloss | silicone rubber aggregates present on the surface, gloss patches present | silicone rubber aggregates present on the surface, gloss patches present | surface is uniform and glossy (lustrous) |
| tactile sensation afforded by coating film | soft | soft | disagreeable | disagreeable | feels hard |
| storage stability | homogeneous, no separation of the silicone rubber microparticles | homogeneous, no separation of the silicone rubber microparticles | silicone rubber microparticles were floating at the top | silicone rubber microparticles were floating at the top | homogeneous |

That which is claimed:

1. A silicone-modified water-based coating composition consisting essentially of a mixture of:

compositions, water-based epoxy resin coating compositions, water-based acrylic resin coating compositions, water-based silicone-modified epoxy resin coating compositions, water-based silicone-modified polyester resin coating compositions and water-based silicone resin coating compositions.

11. The composition according to claim 10, wherein 1 to 150 parts by weight of said particles of suspension (B) are used for each 100 parts by weight of the total solids in said water-based coating composition (A).

12. The composition according to claim 8, wherein said silicone rubber particles have an average size of 1 to 100 micrometers.

13. The composition according to claim 10, wherein said silicone rubber particles have an average size of 1 to 100 micrometers.

14. The composition according to claim 11, wherein said silicone rubber particles have an average size of 1 to 100 micrometers.

15. The composition according to claim 12, wherein 1 to 100 parts by weight of said particles of suspension (B) are used for each 100 parts by weight of the total solids in said water-based coating composition (A).

16. The composition according to claim 13, wherein 1 to 100 parts by weight of said particles of suspension (B) are used for each 100 parts by weight of the total solids in said water-based coating composition (A).

\* \* \* \* \*